Sept. 21, 1971     S. KOWALSKI ET AL     3,606,909
COMBINED PRESSURE REGULATOR AND RELIEF
VALVE WITH SPRING WASHER
Original Filed Nov. 29, 1967
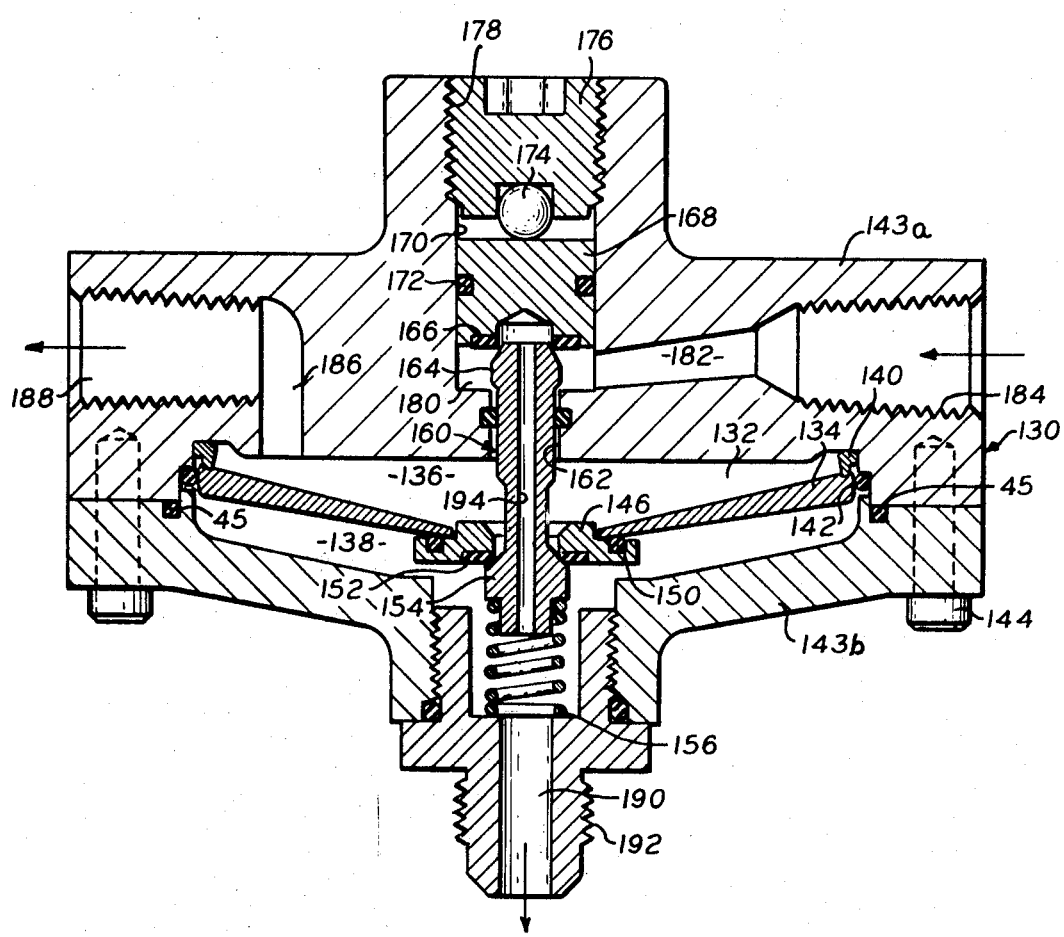
INVENTORS
SLAWOMIR KOWALSKI
DONALD A. WORDEN
ALFRED TILLMAN
ATTORNEYS ക
United States Patent Office 3,606,909
Patented Sept. 21, 1971

3,606,909
COMBINED PRESSURE REGULATOR AND RELIEF VALVE WITH SPRING WASHER
Slawomir Kowalski, Rockaway, Donald A. Worden, Pompton Plains, and Alfred Tillman, Mount Tabor, N.J., assignors to Marotta Valve Corporation, Boonton, N.J.
Original application Nov. 29, 1967, Ser. No. 686,644, now Patent No. 3,508,568. Divided and this application Apr. 8, 1970, Ser. No. 26,525
Int. Cl. G05d 11/02
U.S. Cl. 137—116.3
3 Claims

ABSTRACT OF THE DISCLOSURE

This specification discloses a pressure regulator that employs a Belleville washer, in place of the usual flexible diaphragm or sliding piston, which responds to pressure changes. The washer serves the function of both a diaphragm and a spring. By tapering the washer to less thickness toward its center opening, a softer spring rate is obtained; and a center valve element is held against the washer without connection thereto so as not to interfere with free dishing movement of the washer. A second valve element connected with the first operates when the first valve element moves as a unit with the center portion of the washer. One valve element controls downstream pressure and the other operates as a vent to relieve excessive pressure in the regulator.

RELATED APPLICATION

This application is a division of our copending application Ser. No. 686,644, now U.S. Pat. No. 3,508,568 filed Nov. 29, 1967.

BRIEF DESCRIPTION OF THE INVENTION

This invention relates to apparatus for operating a valve or other element in response to a change in pressure. More specifically, the invention relates to an improved combination of apparatus for sensing the pressure in a regulator.

One object of the invention is to provide improved pressure-regulating means having a tapered washer with a soft spring rate and which serves the dual function of a sensing element (which has usually been a piston or flexible diaphragm) and a reference force element (which has usually been a spring or pressure dome).

The invention will be described as embodied in a simple pressure regulator which operates a valve when necessary to maintain a reduced and substantially constant pressure on the delivery side of the regulator in spite of variations on the upstream or high-pressure side of the regulator, and the valve means includes two connected valve elements, one of which controls downstream pressure and the other of which operates as a vent to relieve excessive pressure in the regulator. It can be used also for pressure-responsive apparatus for operating an electric switch, or for operating some other controller.

Other objects, features and advantages of the invention will appear or be pointed out as the description proceeds.

BRIEF DESCRIPTION OF THE DRAWING

The drawing is a diagrammatic sectional view of a combined pressure regulator and relief valve made in accordance with this invention.

DETAILED DESCRIPTION OF THE INVENTION

A regulator housing 130 encloses a chamber 132 containing a tapered washer 134 which divides the chamber 132 containing a tapered washer 134 which divides the chamber 132 into an upper compartment 136 and a lower compartment 138. The washer 134 is made of stiffly flexible material, and preferably metal, so as to exert a spring action. The washer 134 tapers to a thinner cross section as it extends toward its center opening. This produces a softer spring rate. In the construction illustrated, the periphery of the washer 134 is not clamped between the portions 143a and 143b of the housing 130, but the outside diameter of the washer 134 is substantially equal to the inside diameter of the chamber 132 and the washer has its peripheral portion resting on a support ring 140. There is a sealing ring 142 in a circumferential groove of the chamber 132 surrounding the circumference of the washer 134.

The housing 130 is made of two sections 143a and 143b secured together by screws 144 and with a static body seal 145.

An element 146 of a valve means extends into the center opening of the washer 134 and is held centered in the chamber 132 by the edge of the opening through the washer 134. This element 146 extends radially outward across a portion of the area of the washer 134 around the center opening and has a sealing ring 150 which contacts the washer. There is a valve seat 152 carried by the element 146; and a valve 154 is urged against the seat 152 by a spring 156.

The valve 154 is part of the lower end of a valve element 160 which slides in a guide 162 and which has another valve 164 at its upper end.

This valve 164 closes against a seat 166 located on a plug 168 that is movable up and down in a guide 170. A sealing ring 172, located in a circumferential groove of the plug 168, is under light compression against the sides of the guide 170 so that friction holds the plug 168 in position. A metal ball 174 bears against the upper end of the plug 168 and can be pushed down to displace the plug by rotating a threaded plunger 176 in a threaded portion 178 at the upper end of the guide 170.

Thus the plug 168 can be pushed down into any desired set position by the threaded plunger 176 and the plug 168 can be moved upward by backing off the threaded plunger 176 so that pressure of the valve 164 and the gas in the space below the plug 168 will move the plug upward until it is again in contact with the metal ball 174.

The valve 164 is located in a chamber 180 to which gas is supplied through a passage 182 from an inlet opening 184 having threads for connection with a pipe leading to an outside circuit. The compartment 136 is connected by a passage 186 leading to a vent port 188 which is threaded for connection with a pipe of an outside circuit.

The housing 130 has an outlet port 190 through a fitting 192 screwed into the lower end of the housing and communicating with the compartment 138 below the washer 134. There is a passage 194 leading through the valve element 160.

The valve 164 is balanced as to pressure in the chamber 180. The valve 154 need not be balanced because the apparatus is designed to operate with a constant outlet pressure at the outlet port 190.

The operation of the apparatus is as follows:

When pressure at the outlet port 190 is at the desired value, the pressure in the compartment 138 holds the washer 134 and the element 146 far enough up to permit the spring 156 to hold the valve 154 closed against the seat 152 and to hold the valve 164 closed against the seat 166. When there is a drop in pressure in the compartment 138 below the downstream pressure which the regulator is set to maintain, the spring force of the washer 134 moves the element 146 downward and moves the valve element 160 downward against the compression of the spring 156, and moves the upper valve 164 away from the valve seat 166 so that high pressure gas from the passage 182 and chamber 180 flows past the open valve 164 and down through the passage 194 until the pressure in the outlet port 190 and the compartment 189 builds up to the desired downstream pressure. When pressure is restored, the additional gas pressure in the compartment 138 under the washer 134 thrusts the washer upward and again closes the valve 164. The downstream pressure at which the valve 164 will open depends upon the adjustment of the plug 168 in the guide 170.

The construction also includes a relief valve feature, the valve 154 functioning as a relief valve in the event that the downstream pressure in the outlet port 190 and compartment 138 exceeds a predetermined value. When gas pressure reaches this predetermined value, the gas pushes the washer 134 and the element 146 upward away from the valve 154 which cannot rise because the upper valve 164 is already against its seat 166. Thus the seat 152 moves away from the valve 154 and opens a clearance for the escape of gas from the compartment 138 through the center opening of the element 146 and into the upper compartment 136 which vents through the passage 186 and vent port 188. When the excessive pressure is relieved, the spring force of the washer causes it to move the element 146 and seat 152 downward to their original position with the seat 152 again in contact with the valve 154.

The preferred embodiment of the invention has been illustrated and described. It will be understood that the invention can be applied to other constructions where the tapered spring washer is a suitable operating element, for example in the operation of electric switches. Various changes and modifications can be made, and some features can be used in different combinations without departing from the invention as defined in the claims.

What is claimed is:

1. A pressure regulator including a housing enclosing a chamber, a movable partition dividing the chamber into first and second compartments, valve means in the chamber including first and second elements that move toward and from one another to close and open valve means, respectively, the first element contacting with the partition and being movable with said partition, said first element having a passage therethrough surrounded by a valve seat, the second element being in one of said compartments and contacting with the valve seat, spring means urging the second element against the first element, a third element, a stem connecting the third element with the second element, a passage opening through both the second and third elements and the stem, an inlet chamber in the housing separate from the chamber in which the partition is located, a depression in a wall of the inlet chamber with a valve seat surrounding it, the third element being movable into contact with the seat by the same spring means that urges the second element into contact with the first element, a passage through which fluid at high pressure is supplied to the inlet chamber, a passage through which fluid at reduced pressure flows from the compartment of the regulator containing the second element, and a third passage leading from the other compartment through a wall of the valve chamber for the escape of fluid of excessive pressure.

2. The pressure regulator described in claim 1 characterized by the movable partition being a washer that is stiffly flexible so as to function as a spring and being tapered to thinner cross-section toward its center opening to obtain a softer spring rate, one of the elements of the valve means being movable toward the other by the spring pressure of the washer, and two passages leading through sides of the housing, one into the first compartment and the other into the second compartment, the first element of the valve means being located in the center opening of the washer and being free of any connection to the washer, but extending radially beyond the center opening and confronting the washer over an area of the washer for a limited distance outward from the center opening, a sealing element between the first element and the washer within said area, the washer having a bias toward the first element, the second element contacting with the valve seat on the side of the first valve element opposite to that which contacts with the washer, the spring means urging the second element against the first element in a direction opposing the bias of the washer.

3. The pressure regulator described in claim 2 characterized by the first element of the valve means including a sealing ring covering the area of contact between the first element and said area of the washer over which said first element extends.

References Cited

UNITED STATES PATENTS 3,472,264 10/1969 Petry _____ 137—494
3,508,568 4/1970 Kowalski _____ 137—116.3

WILLIAM F. O'DEA, Primary Examiner

W. H. WRIGHT, Assistant Examiner

U.S. Cl. X.R.

137—112, 116.5, 510, 516.25